United States Patent
Das et al.

(10) Patent No.: US 10,848,462 B2
(45) Date of Patent: Nov. 24, 2020

(54) METHOD AND SYSTEM FOR MANAGING POLICIES IN A NETWORK SECURITY SYSTEM

(71) Applicant: WIPRO LIMITED, Bangalore (IN)

(72) Inventors: Rishav Das, Howrah (IN); Maulik Yagnik, Bangalore (IN)

(73) Assignee: Wipro Limited, Bangalore (IN)

( * ) Notice: Subject to any disclaimer, the term of this patent is extended or adjusted under 35 U.S.C. 154(b) by 281 days.

(21) Appl. No.: 15/940,532

(22) Filed: Mar. 29, 2018

(65) Prior Publication Data

US 2019/0306119 A1    Oct. 3, 2019

(30) Foreign Application Priority Data

Mar. 28, 2018  (IN) .............................. 201841011749

(51) Int. Cl.
| | |
|---|---|
| *H04L 29/06* | (2006.01) |
| *G06F 17/18* | (2006.01) |
| *H04L 12/26* | (2006.01) |
| *H04L 12/24* | (2006.01) |
| *G06F 21/50* | (2013.01) |

(52) U.S. Cl.
CPC .......... *H04L 63/0263* (2013.01); *G06F 17/18* (2013.01); *G06F 21/50* (2013.01); *H04L 41/0893* (2013.01); *H04L 43/0852* (2013.01); *H04L 43/0876* (2013.01);
(Continued)

(58) Field of Classification Search
CPC ............. H04L 63/0263; H04L 41/0893; H04L 43/0852; H04L 43/0876; H04L 63/1408; H04L 63/0227; H04L 63/20; G06F 21/50; G06F 17/18
See application file for complete search history.

(56) References Cited

U.S. PATENT DOCUMENTS

| | | | |
|---|---|---|---|
| 6,816,897 B2 | 11/2004 | McGuire | |
| 7,580,356 B1 * | 8/2009 | Mishra | H04L 43/026 370/230.1 |

(Continued)

OTHER PUBLICATIONS

Extended European Search Report issued in the European Patent Office in counterpart European Application No. 18197569, dated Nov. 14, 2018, 9 pages.

*Primary Examiner* — Matthew Smithers
(74) *Attorney, Agent, or Firm* — Finnegan, Henderson, Farabow, Garrett & Dunner, LLP (57) ABSTRACT

The present disclosure discloses method and policy management system for managing policies in network security system. The policy management system receives one or more data packets from a request source of plurality of request sources, monitors at least one of, an inbound transmission time, an out bound transmission time and a jitter hit rate associated with the one or more data packets and a hit count, a current hit count, last hit time and hit per policy associated with each of plurality of policies of network firewall in real-time. Based on monitoring, policy management system estimates a hit count percentage for each of the plurality of policies and groups plurality of policies into plurality of policy clusters based on hit count percentage associated with each of the plurality of policies. Thus, the present disclosure provides an efficient way of managing network firewall policies without any human intervention.

21 Claims, 7 Drawing Sheets (52) U.S. Cl.
CPC ...... *H04L 63/1408* (2013.01); *H04L 63/0227* (2013.01); *H04L 63/20* (2013.01)

(56) References Cited

U.S. PATENT DOCUMENTS

| | | | |
|---|---|---|---|
| 8,601,113 B2* | 12/2013 | Dolisy | G06F 16/24556 |
| | | | 709/224 |
| 8,644,151 B2* | 2/2014 | Foschiano | H04L 63/1441 |
| | | | 370/232 |
| 9,762,610 B1* | 9/2017 | Kwan | H04L 63/1458 |
| 9,838,354 B1* | 12/2017 | Tulasi | H04L 63/02 |
| 2008/0320582 A1 | 12/2008 | Chen et al. | |
| 2009/0138938 A1* | 5/2009 | Harrison | G06F 21/604 |
| | | | 726/1 |
| 2009/0172800 A1 | 7/2009 | Wool | |
| 2010/0011433 A1 | 1/2010 | Harrison et al. | |
| 2011/0055916 A1 | 3/2011 | Ahn | |
| 2016/0191466 A1* | 6/2016 | Pernicha | H04L 63/20 |
| | | | 726/1 |
| 2017/0353459 A1* | 12/2017 | Lawrence | H04L 63/10 |
| 2018/0367396 A1* | 12/2018 | Kompella | H04L 41/12 |
| 2018/0367445 A1* | 12/2018 | Bajaj | H04L 45/24 |

* cited by examiner

METHOD AND SYSTEM FOR MANAGING POLICIES IN A NETWORK SECURITY SYSTEM

TECHNICAL FIELD

The present subject matter is related in general to network security, more particularly, but not exclusively to method and system for managing policies in a network security system.

BACKGROUND

In recent years, Internet has experienced an explosive growth. With widespread evolution in new computer services, quantity and impact of computer attacks have also increased abundantly. With advancement in technology and increase in usage of computer networks, risk of having networks under attack have also increased. Today, network monitoring has become an essential component of computer security to predict and prevent attacks. One such component for network security is firewall. The firewalls are an important infrastructure element for network security which control ingoing and outgoing network traffic. The firewalls are central points of cyber-attack which help to control unrelated traffic from entering sets of network nodes using a set of policies. The firewalls are designed to prevent unauthorized network intrusions. However, if an intruder or malware slips through the system, the computer becomes vulnerable to additional system attacks, even comes under total control from a malicious party.

In existing systems, the policies of the firewalls are assigned and inserted manually. Sometimes due to manual error in insertion of the policies, data packets may undergo high latency in security checks. Also, sometimes due to unplanned management of the policies, few malicious data packets may slip into the network stream. Typically, the firewalls in the existing systems cannot reduce manual workloads such as, assigning new policies and grouping similar policies depending on the severity or intensity of policies. Moreover, there is a high chance that administrators may, by mistake or due to less experience, fail to create correct policy or assign correct policy in right order. Hence, there is a need for management of the policies of the firewalls.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure may relate to a method managing policies in a network security system. The method comprises receiving one or more data packets from a request source of a plurality of request sources, monitoring at least one of, an inbound transmission time, an out bound transmission time and a jitter hit rate associated with the one or more data packets and a hit count, a current hit count, a last hit time and a hit per policy associated with each of plurality of policies of the network firewall in real-time. The method comprises estimating a hit count percentage for each of the plurality of policies based on the monitoring and grouping the plurality of policies into a plurality of policy clusters, based on the hit count percentage associated with each of the plurality of policies, to manage the policies of the network firewall.

In an embodiment, the present disclosure may relate to a policy management system managing policies in a network security system. The policy management system may comprise a processor and a memory communicatively coupled to the processor, where the memory stores processor executable instructions, which, on execution, may cause the policy management system to receive one or more data packets from a request source of a plurality of request sources, monitor at least one of, an inbound transmission time, an out bound transmission time and a jitter hit rate associated with the one or more data packets and a hit count, a current hit count, a last hit time and a hit per policy associated with each of plurality of policies of the network firewall in real-time. The policy management system estimates a hit count percentage for each of the plurality of policies based on the monitoring and groups the plurality of policies into a plurality of policy clusters, based on the hit count percentage associated with each of the plurality of policies, to manage the policies of the network firewall.

In an embodiment, the present disclosure relates to a non-transitory computer readable medium including instructions stored thereon that when processed by at least one processor may cause a policy management system to receive one or more data packets from a request source of a plurality of request sources, monitor at least one of, an inbound transmission time, an out bound transmission time and a jitter hit rate associated with the one or more data packets and a hit count, a current hit count, a last hit time and a hit per policy associated with each of plurality of policies of the network firewall in real-time. The instruction causes the processor to estimate a hit count percentage for each of the plurality of policies based on the monitoring and group the plurality of policies into a plurality of policy clusters, based on the hit count percentage associated with each of the plurality of policies, to manage the policies of the network firewall.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a method and a policy management system for managing policies in a network security system. In an embodiment, the network security system may refer to a system which enforces boundaries between computing networks. One such network security system may be a firewall. In an embodiment, the firewall is a network security system which prevents unauthorized access to or from a private network. The policy management system may receive data packets through the associated firewall. Parameters such as, inbound transmission time, out bound transmission time and jitter hit rate associated with the data packets are monitored. In addition, parameters of a plurality of policies of the network firewall, such as, a hit count, a current hit count, a last hit time and a hit per policy may be monitored in real-time. In an embodiment, the plurality of policies associated with the firewall may define and filter network traffic in order to mitigate risks and losses associated with security threats. The plurality of policies may be grouped into a plurality of policy clusters, based on a hit count percentage estimated based on the monitoring for each of the plurality of policies. In an embodiment, the plurality of policies may be grouped into the plurality of policy clusters based on a ranking assigned to the plurality of policies using corresponding hit count percentage. Thereafter, whenever any upcoming data packets are received, the policy management system may scan those data packets using the plurality of policies in an order of a ranking of the plurality of policy clusters and an order of the ranking of the plurality of policies within each of the plurality of policy clusters. The present invention provides an efficient way of managing network firewall policies without any human intervention.

Figure 1:
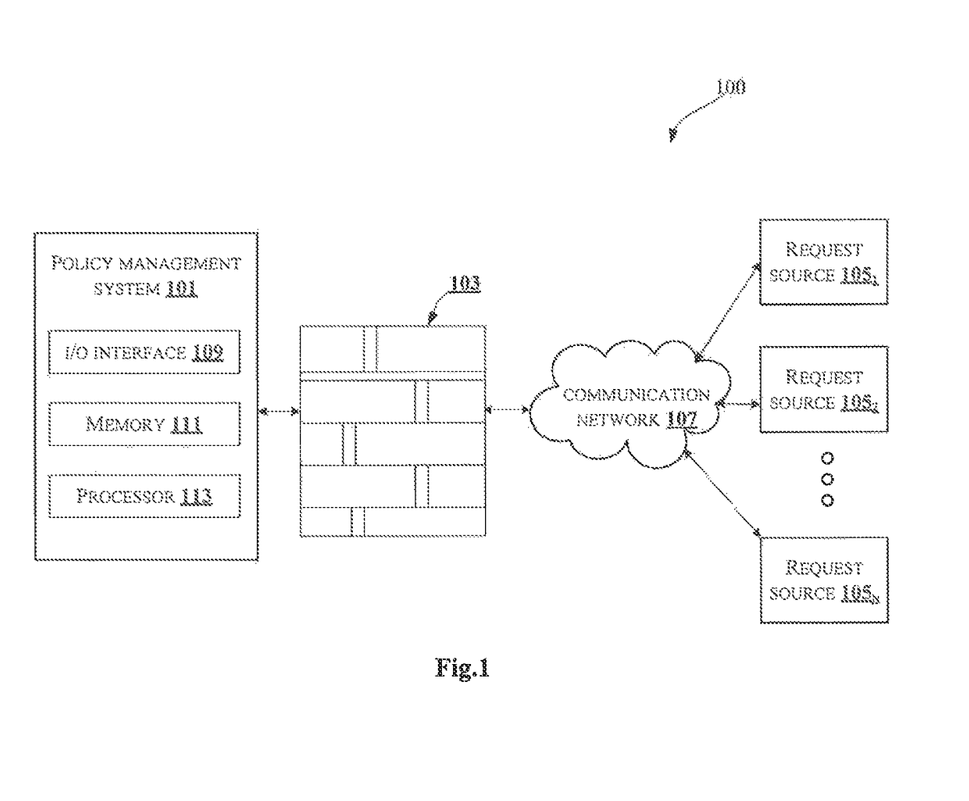
FIG. 1 illustrates an exemplary environment for managing policies in a network security system in accordance with some embodiments of the present disclosure.

FIG. 1 illustrates an exemplary environment for managing policies in a network security system in accordance with some embodiments of the present disclosure.

As shown in FIG. 1, an environment 100 comprises a policy management system 101 connected to a firewall 103. In an embodiment, the firewall 103 may be a network firewall or a host-based firewall. In an embodiment, the policy management system 101 may be connected to the firewall 103 through a communication network (not shown explicitly in FIG. 1). In an embodiment, the firewall 103 is a network security system which prevents unauthorized access to or from a private network based on predefined plurality of policies. The firewall 103 is connected through a communication network 107 to a request source $105_1$, a request source $105_2$, . . . and a request source $105_N$ (collectively referred as plurality of request sources 105). In an embodiment, the plurality of request sources 105 may include any computing device, but is not limited to, a laptop, a desktop computer, a Personal Digital Assistant (PDA), a notebook, a smartphone, a tablet, a server, and any other computing devices. A person skilled in the art would understand that, any other source for providing data packets not mentioned explicitly, may also be used in the present disclosure. Further, the communication network 107 may include, but is not limited to, a direct interconnection, an e-commerce network, a Peer to Peer (P2P) network, Local Area Network (LAN), Wide Area Network (WAN), wireless network (e.g., using Wireless Application Protocol), Internet, Wi-Fi and the like. The policy management system 101 manages policies in the network security system. In an embodiment, the policy management system 101 may include, but is not limited to, a laptop, a desktop computer, a Personal Digital Assistant (PDA), a notebook, a smartphone, a tablet, a server, and any other computing devices. A person skilled in the art would understand that, any other devices, not mentioned explicitly, may also be used as the policy management system 101 in the present disclosure. The policy management system 101 may comprise an I/O interface 109, a memory 111 and a processor 113. The policy management system 101 may receive one or more data packets from a request source of the plurality of request sources 105, through the firewall 103. In an embodiment, the data packets may refer to a segment of data transmitted from the plurality of request sources 105. In an embodiment, the data packets may be associated with any type of data such as, audio, video, emails, documents and the like.

The policy management system 101 may monitor at least one of an inbound transmission time, an out bound transmission time and a jitter hit rate associated with the one or more data packets and a hit count, a current hit count, a last hit time and a hit per policy associated with each of the plurality of policies of the network firewall 103 in real-time. In an embodiment, the plurality of policies of the network firewall 103 may define how an organization may handle inbound and outbound network traffic for specific IP addresses and address ranges, protocols, applications, and content types based on the organization information security policies. The policy management system 101 may estimate a hit count percentage for each of the plurality of policies based on the monitoring. In an embodiment, the hit count percentage represents number of times each policy in the plurality of policies is referenced. In an embodiment, the hit count percentage is estimated based on at least one of multilinear regression and linear regression technique. A person skilled in the art would understand that, any other technique for estimating hit count percentage, not mentioned explicitly, may also be used in the present disclosure.

Further, the policy management system 101 may group the plurality of policies into a plurality of policy clusters, based on the hit count percentage associated with each of the plurality of policies. In an embodiment, grouping the plurality of policies comprises ranking the plurality of policies based on corresponding hit count percentage and grouping the plurality of policies into the plurality of policy clusters based on the ranking. In an embodiment, the policy management system 101 may rank the plurality of policy clusters based on the ranking of the plurality of policies associated with each of the policy cluster. At any instant, when any upcoming data packets are received, the policy management system 101 may scan the data packets using the plurality of policies in an order of the ranking of the plurality of policy clusters and an order of the ranking of the plurality of policies within each of the plurality of policy clusters. Further, the policy management system 101 may scan the data packets with the plurality of policies associated with a policy cluster of the plurality of policy clusters ranked subsequent to a current scanning policy cluster of the plurality of policy clusters, when the data packets are passed by the current scanning policy cluster.

The I/O interface 109 may be configured to receive the one or more data packets from one of the request source of the plurality of request sources 105, through the firewall 103. The information received from the I/O interface 109 may be stored in a memory 111. The memory 111 may be communicatively coupled to the processor 113 of the policy management system 101. The memory 111 may also store processor instructions which may cause the processor 113 to execute the instructions for managing policies in a network security system.

Figure 2:
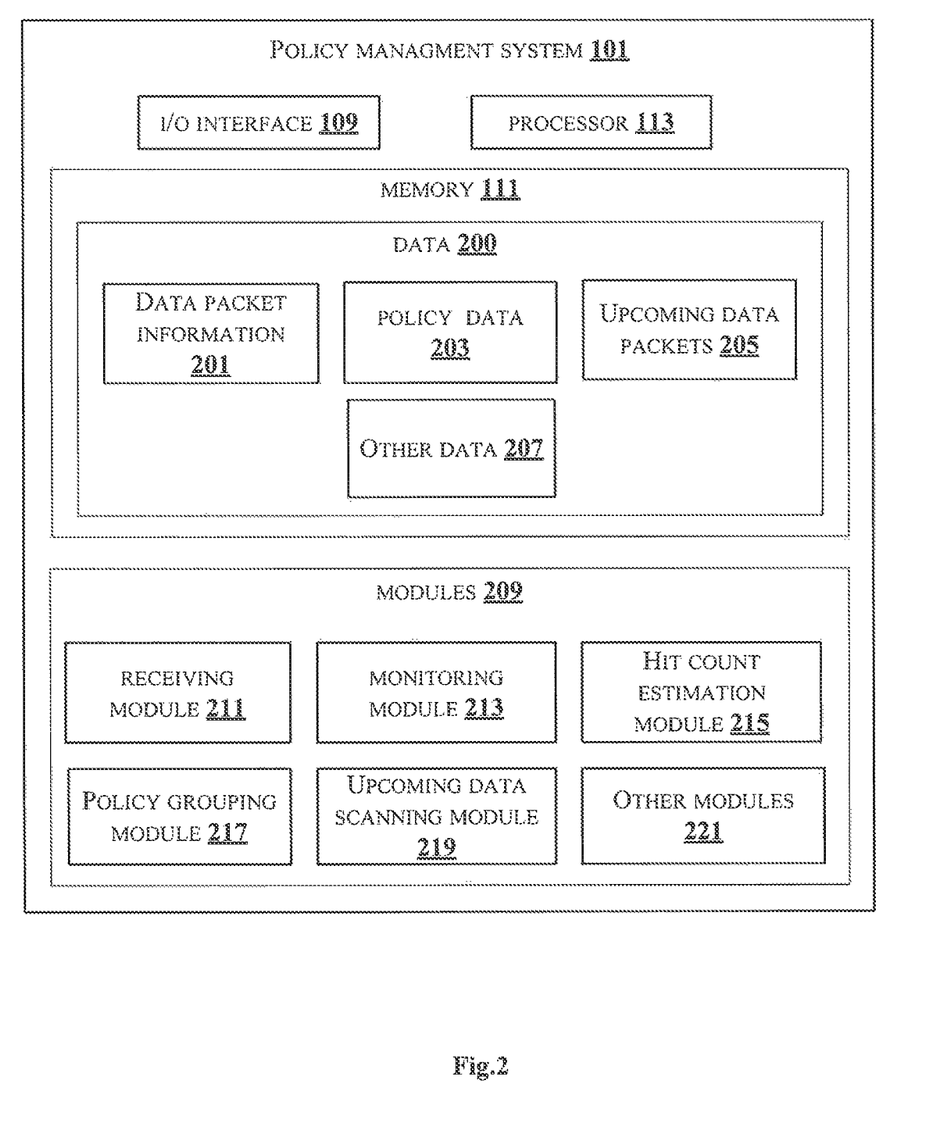
FIG. 2 shows a detailed block diagram of a policy management system in accordance with some embodiments of the present disclosure.

FIG. 2 shows a detailed block diagram of a policy management system in accordance with some embodiments of the present disclosure.

Data 200 and one or more modules 209 of the policy management system 101 are described herein in detail. In an embodiment, the data 200 may include data packet information 201, policy data 203, upcoming data packets 205 and other data 207.

The data packet information 201 may comprise information about the one or more data packets flowing through the firewall 103. The information may comprise details on inbound transmission time, out bound packet transmission time and jitter hit rate for each of the received one or more data packets. A person skilled in the art would understand that the data packet information 201 may include any other information, not mentioned explicitly in the present disclosure. In an embodiment, the inbound transmission time may refer to an amount of time taken for transmitting data from first bit to last bit from the plurality of request sources 105. In an embodiment, the outbound transmission time may refer to an amount of time taken for transmitting the data from the first bit to last bit from the firewall 103. In an embodiment, the jitter hit rate may be associated with one or more data packets which may not be delivered to the firewall 103 or delivered with a delay. The jitter hit rate may refer to a record which comprises number of such one or more data packets which may not be delivered or delivered with the delay in the firewall 103.

The policy data 203 may comprise information about the plurality of policies associated with the firewall 103. In an embodiment, the policy data 203 may comprise values of the hit count, the current hit count, the last hit time, and the hit per policy associated with each of plurality of policies of the firewall 103. In an embodiment, the values may change constantly based on the real-time monitoring. The hit count may indicate the number of times the plurality of policies may be referenced by the data packets. In an embodiment, the current hit count may refer to number of times the plurality of policies may be referenced from last reset. In an embodiment, the last hit time may refer to a time when the data packets last referenced the plurality of policies. In an embodiment, the hit per policy may refer to number of references associated with each of the plurality of policies. In an embodiment, the plurality of policies may be created by users associated with the firewall 103. In an embodiment, an administrator associated with the firewall 103 may access the plurality of policies and may perform read and write operation on the plurality of policies. In an embodiment, the policy data 203 may be stored locally and remotely. In an embodiment, local policy may comprise policies defined specific to a network associated with an organization. In an embodiment, remote policy may comprise standards on how to connect to an organization network and security system.

The upcoming data packets 205 may be the data packets received at the firewall 103 at any instant of time from one of the request source of the plurality of request sources 105. The upcoming data packet may be scanned using the plurality of policies in the order of the ranking of the plurality of policy clusters and the order of the ranking of the plurality of policies within each of the plurality of policy clusters.

The other data 207 may store data 200, including temporary data and temporary files, generated by modules 209 for performing the various functions of the policy management system 101.

In an embodiment, the data 200 in the memory 11*l* are processed by the one or more modules 209 of the policy management system 101. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The said modules 209 when configured with the functionality defined in the present disclosure will result in a novel hardware.

In one implementation, the one or more modules 209 may include, but are not limited to a receiving module 211, a monitoring module 213, a hit count module estimation 215, a policy grouping module 217 and an upcoming data scanning module 219. The one or more modules 209 may also include other modules 221 to perform various miscellaneous functionalities of the policy management system 101. In an embodiment, the other modules 221 may include a policy ranking module for ranking the plurality of policies based on the corresponding hit count percentage and a cluster ranking module for ranking the plurality of clusters based on the ranking of the plurality of policies associated with each of the policy cluster.

The receiving module 211 may receive the one or more data packets from one request source of the plurality of request sources 105, through the firewall 103. The one or more data packets may be received at the firewall 103.

The monitoring module 213 may monitor at least one of the inbound transmission time, the out bound transmission time and the jitter hit rate associated with the one or more data packets received at any instant of time. Simultaneously, the monitoring module 213 may monitor the hit count, the current hit count, the last hit time and the hit per policy associated with each of the plurality of policies of the firewall 103, whenever the one or more data packets are received.

The hit count estimation module may estimate the hit count percentage associated with each of the plurality of policies of the firewall 103. In an embodiment, the hit count percentage represents number of times each policy in the plurality of policies is referenced by a data packet. The hit count estimation module may estimate the hit count percentage based on the inbound transmission time, the out bound transmission time and the jitter hit rate monitored for the one or more data packets and the hit count, the current hit count, the last hit time and the hit per policy for the plurality of policies of the firewall 103.

In an embodiment, the hit count percentage is estimated based on at least one of the multilinear regression and the linear regression technique. A person skilled in the art would understand that, any other technique, not mentioned explicitly may also be used in the present disclosure.

The policy grouping module 217 may group the plurality of policies associated with the firewall 103 into the plurality of policy clusters based on the hit count percentage associated with each of the plurality of policies. The policy grouping module 217 may group the plurality of policies based on the ranking assigned to the plurality of policies by the policy ranking module. For example, the hit count percentage for five policies namely P1, P2, P3, P4 and P5 are 89%, 72%, 99%, 52% and 60% respectively. In such case, the policy grouping module 217 may retrieve the ranking for the five policies from the policy ranking module. For instance, the ranking retrieved from the policy ranking module may be in order of P3, P1, P2, P5 and P4 respectively based on the hit count percentage. The policy grouping module 217 may group the five policies into the plurality of policy clusters in the order of the ranking. An exemplary policy cluster with associated ranked policies is disclosed in Table I below.

TABLE 1

| Cluster ID | Policy ID | Policy details | Rank |
|---|---|---|---|
| CID_2875 | PID_324 | Connect with IP starting with numeric value 168 | 1 |
| CID_2875 | PID_343 | The address ending between should be 4 to 55 | 2 |
| CID_2875 | PID_354 | The IP should not change into private IP | 3 |
| CID_2875 | PID_297 | If the IP starting with 168, route that to XY host | 4 |

The upcoming data scanning module 219 may scan the upcoming data packets 205 using the plurality of policies in the order of the ranking of the plurality of policy clusters and the order of the ranking of the plurality of policies within each of the plurality of policy clusters. For instance, if a policy cluster is ranked first and comprises four policies P1, P2, P3 and P4 in the order of rank as P4, P2, P1 and P3. The upcoming data scanning module 219 may scan the upcoming data packets 205 using the polices in the order of P4, P2, P1 and P3. Further, the upcoming data scanning module 219 may subsequently scan the upcoming data packets 205 with the plurality of policies associated with the policy cluster of the plurality of policy clusters which may be ranked after the current scanning policy cluster of the plurality of policy clusters. The subsequent scanning may be performed when the current scanning policy cluster passes the upcoming data packets 205.

Figure 3A:
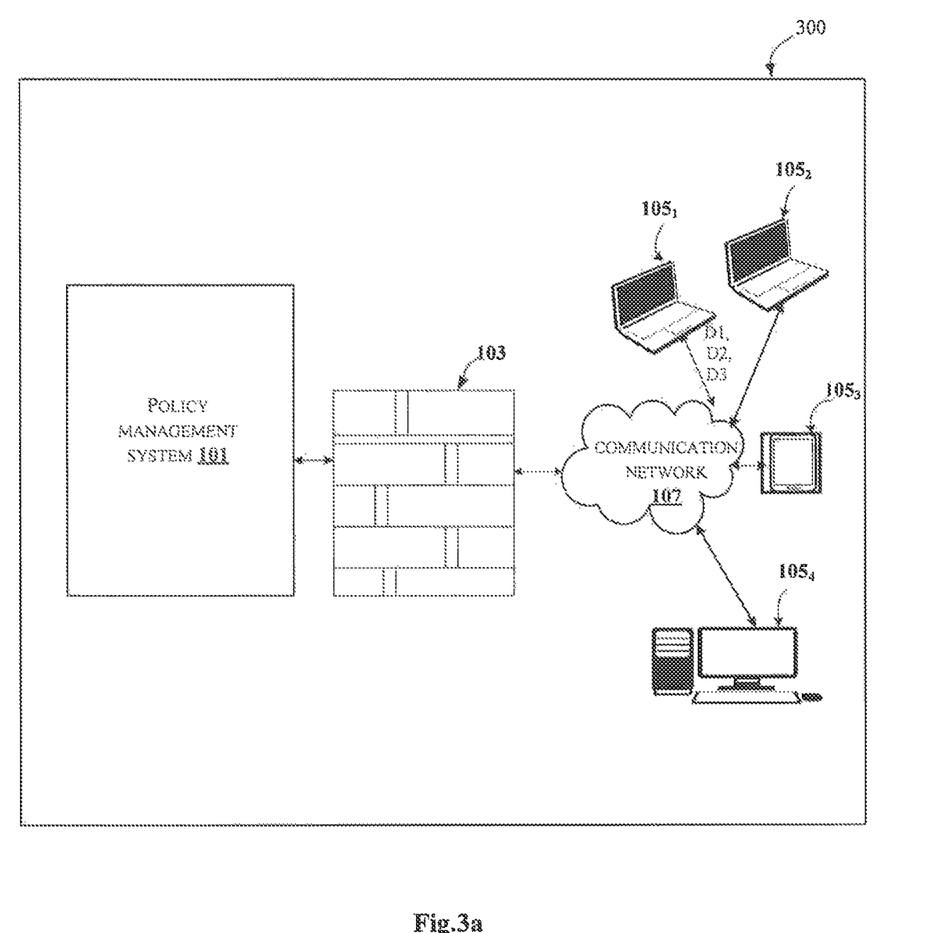
FIG. 3a show an exemplary representation for managing policies associated with a firewall of an organization in accordance with some embodiments of the present disclosure.

FIG. 3a shows an exemplary representation for managing policies associated with a firewall of an enterprise in accordance with some embodiments of the present disclosure.

Figure 3B:
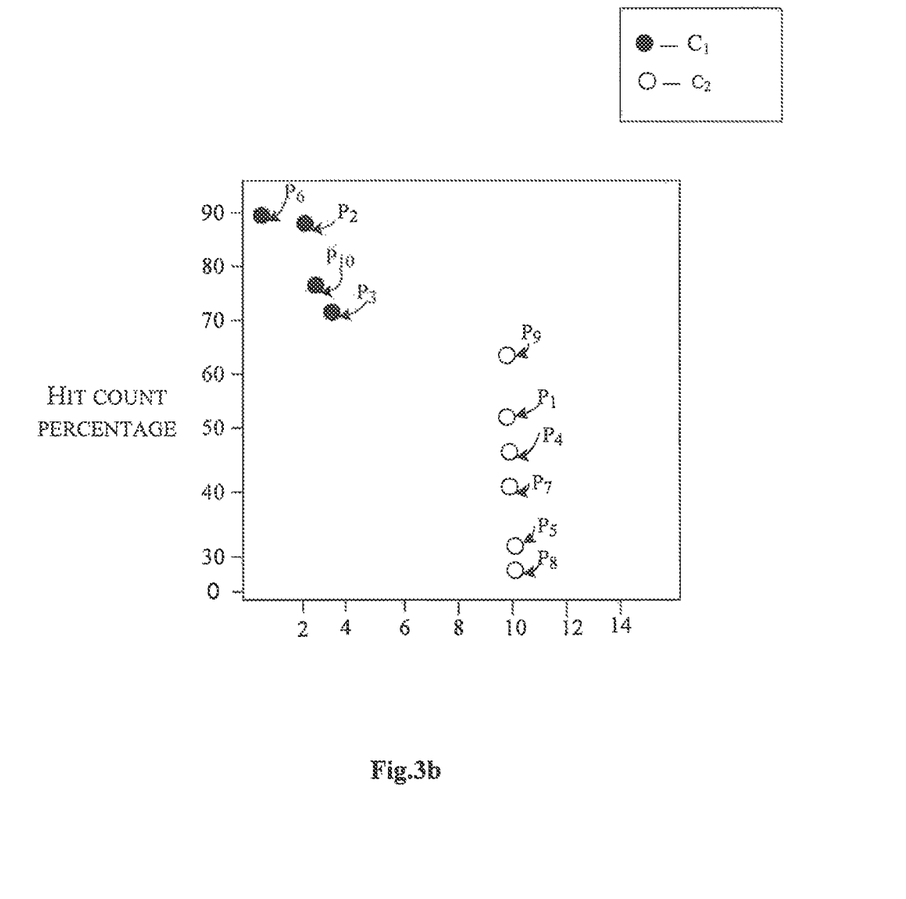
FIG. 3b and FIG. 3c illustrate an exemplary representation of policies in policy clusters at instant T1 and T2 in accordance with some embodiments of the present disclosure.

Referring now to FIG. 3a, an exemplary representation 300 for managing policies of the firewall 103 associated with an organization is illustrated. The exemplary representation 300 comprises the policy management system 101 connected to the firewall 103 of the organization. The firewall 103 may be connected through the communication network 107 to a request source $105_1$, a request source $105_2$, a request source $105_3$ and a request source $105_4$. A person skilled in the art would understand that FIG. 3a is an exemplary embodiment and the present disclosure may also include plurality of request sources 105. Consider, the firewall 103 comprise ten policies namely, P1, P2, P3, P4, P5, P6, P7, P8, P9 and P10 (referred as P1-P10). Currently, the hit count percentage associated with the (P1-P10) are "50", "89", "71", "45", "30", "90", "40", "20", "62" and "75" respectively. The ten policies (P1-P10) may be clustered under two policy clusters namely, policy cluster C1 and policy cluster C2 based on the hit count percentage associated with each of the ten policies. The policies P6, P2, P10 and P3 are grouped under policy cluster C1 and policies P9, P1, P4, P7, P5 and P8 are grouped under policy cluster C2 based on the corresponding hit count percentage as shown in FIG. 3b.

Suppose, at an instant of time, the policy management system 101 may receive one or more data packets from the request source $105_1$, through the firewall 103. For instance, the policy management system 101 may receive three data packets namely, D1, D2 and D3 from the request source $105_1$. The policy management system 101 may monitor at least one of the inbound transmission time, the out bound transmission time and the jitter hit rate for the data packets D1, D2 and D3. Subsequently, the policy management system 101 may monitor the hit count, the current hit count, the last hit time, and the hit per policy associated with the ten policies (P1-P10) of the firewall 103 in real-time. Further, the policy management system 101 may estimate current hit count percentage associated with each of the ten policies (P1-P10) based on the monitoring. For instance, consider, the policy management system 101 estimates the current hit count percentage for P1, P2, P3, P4, P5, P6, P7, P8, P9 and P10 as "65", "89", "71", "45", "30", "90", "40", "20", "62" and "75" respectively.

Figure 3C:
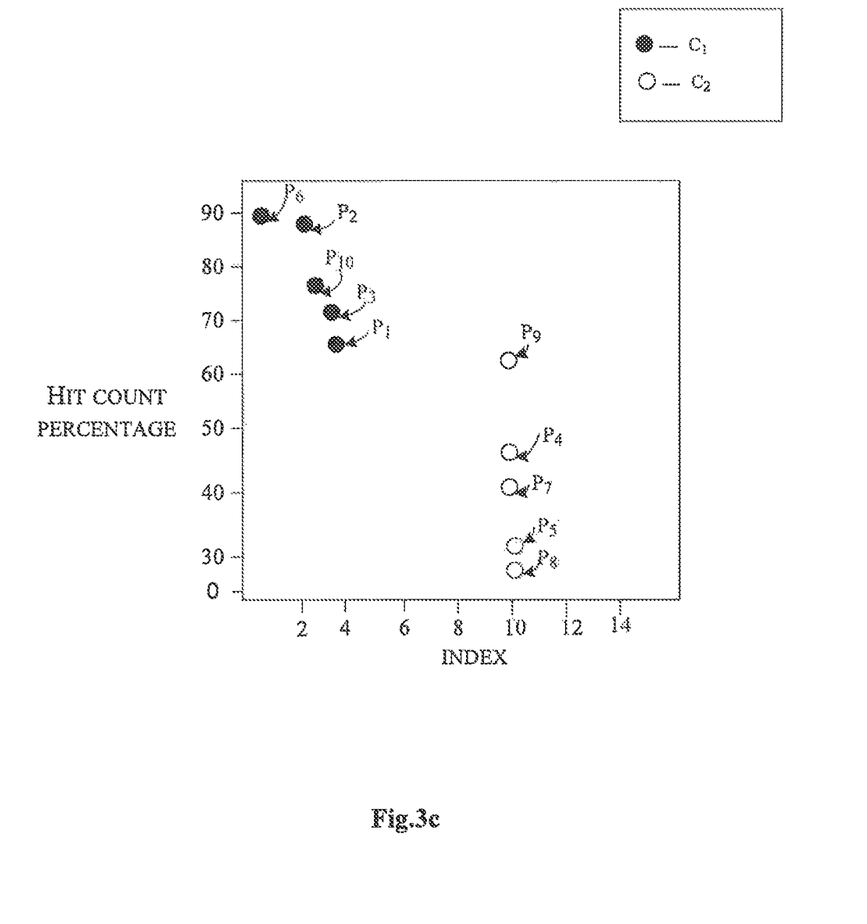

Thereafter, based on the estimated hit count percentage, the policy management system 101 may rank the ten policies (P1-P10) as P6, P2, P10, P3, P1, P9, P4, P7, P5 and P8. Further, the policy management system 101 may regroup the ten policies (P1-P10) by grouping the policy P1 under the policy cluster C1. Thus, the policies P9, P2, P10, P3 and P1 are grouped under the policy cluster C1 and the policies P9, P4, P7, P5 and P8 are grouped under policy cluster C2 as shown in FIG. 3c. Thereafter, when the policy management system 101 receives any upcoming data packets from any of request sources, the upcoming data packets may be scanned using the policy cluster C1 which is ranked first based on the ranking of the policies within the policy cluster C1. Further, within the policy cluster C1, the policy management system 101 may scan the upcoming data packets using the policy P6 first. Subsequently, the upcoming data packets may be scanned by the policies P2, P10, P3 and P1. For instance, consider that the upcoming data packets may be passed by the policies of the policy cluster C1. In such case, the data packets may be scanned by the policies of the policy cluster C2 in the order of the ranking. Alternatively, for instance, if the upcoming data packets may not get passed by the policies of the policy cluster C2, the policy management system 101 may discard such upcoming data packets.

Figure 4:
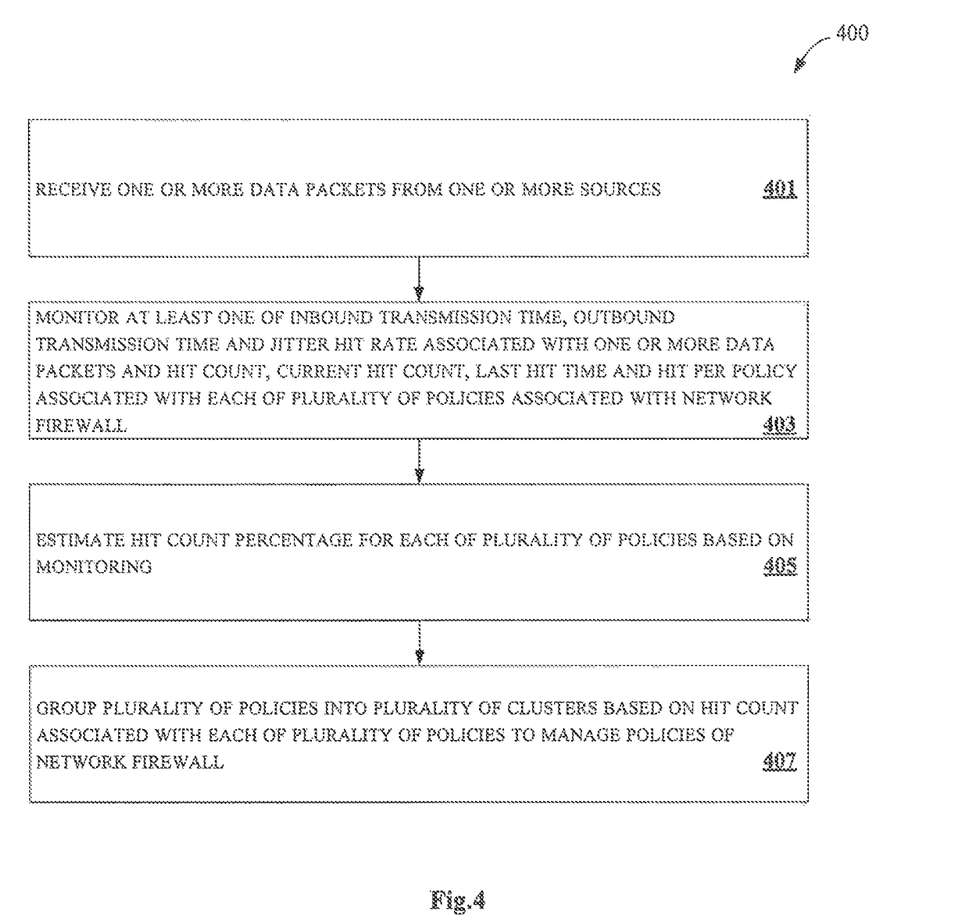
FIG. 4 illustrates a flowchart showing a method for managing policies in a network security system in accordance with some embodiments of present disclosure.

FIG. 4 illustrates a flowchart showing a method 400 for managing policies in a network security system in accordance with some embodiments of present disclosure.

As illustrated in FIG. 4, the method 400 includes one or more blocks for managing policies in the network. The method 400 may be described in the general context of computer executable instructions. Generally, computer executable instructions can include routines, programs, objects, components, data structures, procedures, modules 209, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 401, the one or more data packets are received by the receiving module 211 from the request source of the plurality of request sources 105.

At block 403, the monitoring module 213 monitors at least one of an inbound transmission time, an out bound transmission time and a jitter hit rate associated with the one or more data packets and a hit count, a current hit count, a last hit time and a hit per policy associated with each of plurality of policies of the network firewall 103 in real-time.

At block 405, a hit count percentage is estimated, by the hit count estimation module 215 for each of the plurality of policies based on the monitoring.

At block 407, the plurality of policies is grouped, by the policy grouping module 217, into a plurality of policy clusters based on the hit count percentage associated with each of the plurality of policies, to manage the policies of the network firewall 103.

Figure 5:
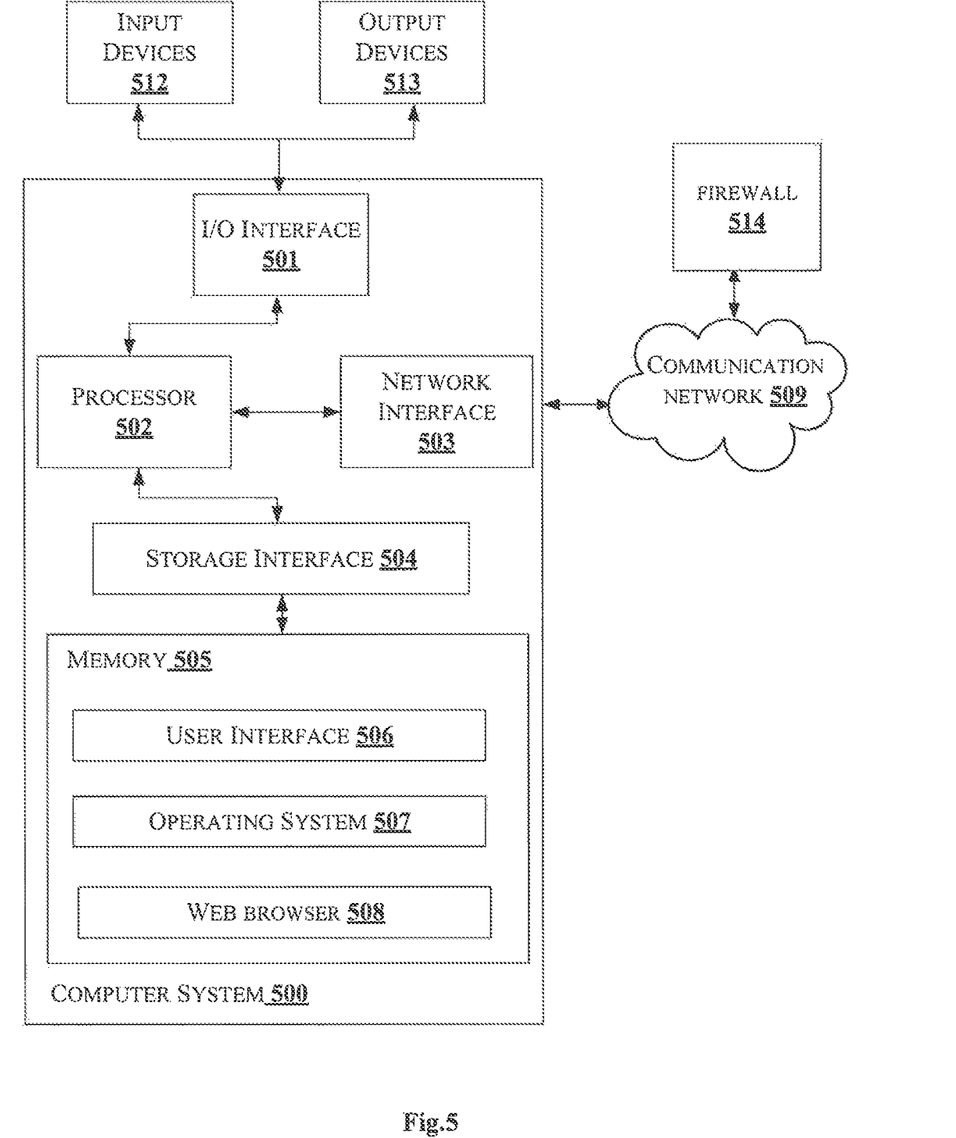
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be used to implement the policy management system 101. The computer system 500 may include a central processing unit ("CPU" or "processor") 502. The processor 502 may include at least one data processor for managing policies in a network security system. The processor 502 may include specialized processing units such as, integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 500 consists of the policy management system 101. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 509 may include, without limitation, a direct interconnection, local area network (LAN), wide area network (WAN), wireless network (e.g., using Wireless Application Protocol), the Internet, etc. Using the network interface 503 and the communication network 509, the computer system 500 may communicate with a firewall 514. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 509 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507 etc. In some embodiments, computer system 500 may store user/application data 506, such as, the data, variables, records, etc., as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT®, UBUNTU™, KUBUNTU™, etc.), IBM™ OS/2, MICROSOFT™ WINDOWS™ (XP™, VISTA™/7/8, 10 etc.), APPLE® IOS™ GOOGLE® ANDROID™, BLACKBERRY® OS, or the like.

In some embodiments, the computer system 500 may implement a web browser 508 stored program component. The web browser 508 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 508 may utilize facilities such as AJAX®, DHTML™, ADOBE® FLASH™, JAVASCRIPT™, JAVA™, Application Programming Interfaces (APIs), etc. In some embodiments, the computer system 500 may implement a mail server stored program component. The mail server may be an Internet mail server such as Microsoft Exchange, or the like. The mail server may utilize facilities such as ASP™, ACTIVEX™, ANSI™ C++/C #, MICROSOFT®, .NET™, CGI SCRIPTS™, JAVA™, JAVASCRPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 500 may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure automatically assigns policies in firewall at right place.

An embodiment of the present disclosure eliminates manual error or assignment error while managing the policies of network firewall.

An embodiment of the present disclosure eliminates human intervention for maintaining policies of firewall on day-to-day basis.

An embodiment of the present disclosure predicts hit count of policies and distributes computational cycle accordingly.

An embodiment of the present disclosure manages multiple firewall policies for multiple devices and network streams.

An embodiment of the present disclosure provides cost efficient methodology for managing policies of firewall.

An embodiment of the present disclosure groups policies of firewall in real-time, whenever hit count percentage of the policies changes, thereby reducing manual work of managing the policies.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further include a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Policy management system |
| 103 | Firewall |
| 105 | Plurality of request sources |
| 107 | Communication network |
| 109 | I/O interface |
| 111 | Memory |
| 113 | Processor |
| 200 | Data |
| 201 | Data packet information |
| 203 | Policy data |
| 205 | Upcoming data packets |
| 207 | Other data |
| 209 | Modules |
| 211 | Receiving module |
| 213 | Monitoring module |
| 215 | Hit count estimation module |
| 217 | Policy grouping module |
| 219 | Upcoming data scanning module |
| 221 | Other modules |
| 500 | Computer system |
| 501 | I/O interface |
| 502 | Processor |
| 503 | Network interface |
| 504 | Storage interface |
| 505 | Memory |
| 506 | User interface |
| 507 | Operating system |
| 503 | Web browser |
| 509 | Communication network |
| 512 | Input devices |
| 513 | Output devices |
| 514 | Firewall |

What is claimed is:

1. A method for managing policies in a network security system, the method comprising:
   receiving, by a policy management system associated with a network firewall, one or more data packets from a request source of a plurality of request sources;
   performing, by the policy management system, first monitoring of an inbound transmission time, an out bound transmission time, and a jitter hit rate associated with the one or more data packets, wherein the jitter hit rate is associated with one or more data packets not delivered, or delivered with a delay to the firewall;
   performing, by the policy management system, second monitoring of at least one of a hit count, a current hit count, a last hit time, and a hit per policy associated with each of a plurality of policies of the network firewall in real-time;
   estimating, by the policy management system, a hit count percentage for each of the plurality of policies based on the first monitoring and the second monitoring; and
   grouping, by the policy management system, the plurality of policies into a plurality of policy clusters, based on the hit count percentage associated with each of the plurality of policies, to manage the policies of the network firewall, wherein grouping the plurality of policies comprises distributing computational cycle based on the hit count percentage.

2. The method as claimed in claim 1, wherein the hit count percentage represents number of times each policy in the plurality of policies is referenced.

3. The method as claimed in claim 1, wherein the hit count percentage is estimated based on at least one of multilinear regression and linear regression technique.

4. The method as claimed in claim 1, wherein grouping the plurality of policies further comprises:
ranking, by the policy management system, the plurality of policies based on corresponding hit count percentage; and
grouping, by the policy management system, the plurality of policies into the plurality of policy clusters based on the ranking.

5. The method as claimed in claim 4, further comprising:
ranking the plurality of policy clusters based on the ranking of the plurality of policies associated with each of the policy cluster.

6. The method as claimed in claim 5, further comprising:
scanning, by the policy management system, upcoming data packets, using the plurality of policies in an order of the ranking of the plurality of policy clusters and an order of the ranking of the plurality of policies within each of the plurality of policy clusters.

7. The method as claimed in claim 6, further comprising:
scanning the upcoming data packets with the plurality of policies associated with a policy cluster of the plurality of policy clusters ranked subsequent to a current scanning policy cluster of the plurality of policy clusters, when the upcoming data packets are passed by the current scanning policy cluster.

8. A policy management system for managing policies in a network security system, comprising:
a processor; and
a memory communicatively coupled to the processor, wherein the memory stores processor instructions, which, on execution, cause the processor to:
receive one or more data packets from a request source of a plurality of request sources;
perform first monitoring of an inbound transmission time, an out bound transmission time, and a jitter hit rate associated with the one or more data packets, wherein the jitter hit rate is associated with one or more data packets not delivered, or delivered with a delay to the firewall;
perform second monitoring of at least one of a hit count, a current hit count, a last hit time, and a hit per policy associated with each of a plurality of policies of a network firewall in real-time;
estimate a hit count percentage for each of the plurality of policies based on the first monitoring and the second monitoring; and
group the plurality of policies into a plurality of policy clusters, based on the hit count percentage associated with each of the plurality of policies, to manage the policies of the network firewall, wherein grouping the plurality of policies comprises distributing computation cycle based on the hit count percentage.

9. The policy management system as claimed in claim 8, wherein the hit count percentage represents number of times each policy in the plurality of policies is referenced.

10. The policy management system as claimed in claim 8, wherein the hit count percentage is estimated based on at least one of multilinear regression and linear regression technique.

11. The policy management system as claimed in claim 8, wherein the processor further groups the plurality of policies by:
ranking the plurality of policies based on corresponding hit count percentage; and
grouping the plurality of policies into the plurality of policy clusters based on the ranking.

12. The policy management system as claimed in claim 11, wherein the processor ranks the plurality of policy clusters based on the ranking of the plurality of policies associated with each of the policy cluster.

13. The policy management system as claimed in claim 12, wherein the processor performs:
scanning upcoming data packets using the plurality of policies in an order of the ranking of the plurality of policy clusters and an order of the ranking of the plurality of policies within each of the plurality of policy clusters.

14. The policy management system as claimed in claim 13, wherein the processor scans the upcoming data packets with the plurality of policies associated with a policy cluster of the plurality of policy clusters ranked subsequent to a current scanning policy cluster of the plurality of policy clusters, when the upcoming data packets are passed by the current scanning policy cluster.

15. A non-transitory computer readable medium including instructions stored thereon that when processed by at least one processor cause a policy management system to perform operations comprising:
receiving one or more data packets from a request source of a plurality of request sources;
performing first monitoring of an inbound transmission time, an out bound transmission time, and a jitter hit rate associated with the one or more data packets, wherein the jitter hit rate is associated with one or more data packets not delivered, or delivered with a delay to the firewall;
performing, by the policy management system, second monitoring of at least one of a hit count, a current hit count, a last hit time, and a hit per policy associated with each of a plurality of policies of the network firewall in real-time;
estimating a hit count percentage for each of the plurality of policies based on the first monitoring and the second monitoring; and
grouping the plurality of policies into a plurality of policy clusters, based on the hit count percentage associated with each of the plurality of policies, to manage the policies of the network firewall, wherein grouping the plurality of policies comprises distributing computational cycle based on the hit count percentage.

16. The medium as claimed in claim 15, wherein the hit count percentage represents number of times each policy in the plurality of policies is referenced.

17. The medium as claimed in claim 15, wherein the hit count percentage is estimated based on at least one of multilinear regression and linear regression technique.

18. The medium as claimed in claim 15, wherein the instructions further cause the at least one processor to group the plurality of policies by:
ranking the plurality of policies based on corresponding hit count percentage; and
grouping the plurality of policies into the plurality of policy clusters based on the ranking.

19. The medium as claimed in claim 18, wherein the instructions cause the at least one processor to rank the plurality of policy clusters based on the ranking of the plurality of policies associated with each of the policy cluster.

20. The medium as claimed in claim 19, wherein the instructions cause the at least one processor to:

scan upcoming data packets, using the plurality of policies in an order of the ranking of the plurality of policy clusters and an order of the ranking of the plurality of policies within each of the plurality of policy clusters.

21. The medium as claimed in claim 20, wherein the instructions cause the at least one processor to:
scan the upcoming data packets with the plurality of policies associated with a policy cluster of the plurality of policy clusters ranked subsequent to a current scanning policy cluster of the plurality of policy clusters, when the upcoming data packets are passed by the current scanning policy cluster.

* * * * *